US012243469B2

(12) United States Patent
Lee et al.

(10) Patent No.: US 12,243,469 B2
(45) Date of Patent: Mar. 4, 2025

(54) DISPLAY DRIVING APPARATUS FOR OPERATING DISPLAY DEVICE THAT DISPLAYS IMAGE AND CONTROL METHOD THEREFOR

(71) Applicant: LX SEMICON CO., LTD., Daejeon (KR)

(72) Inventors: Jong Suk Lee, Daejeon (KR); Seok Jae Oh, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/537,078

(22) Filed: Dec. 12, 2023

(65) Prior Publication Data

US 2024/0194119 A1 Jun. 13, 2024

(30) Foreign Application Priority Data

Dec. 13, 2022 (KR) ........................ 10-2022-0173357
Dec. 13, 2022 (KR) ........................ 10-2022-0173358
Nov. 23, 2023 (KR) ........................ 10-2023-0164135

(51) Int. Cl.
*G09G 3/20* (2006.01)

(52) U.S. Cl.
CPC ............. *G09G 3/2096* (2013.01); *G09G 3/20* (2013.01); *G09G 2310/0275* (2013.01); *G09G 2320/041* (2013.01); *G09G 2330/023* (2013.01)

(58) Field of Classification Search
CPC ................... G09G 3/20; G09G 3/2096; G09G 2310/0275; G09G 2320/041; G09G 2330/023
See application file for complete search history.

(56) References Cited

U.S. PATENT DOCUMENTS

2014/0014154 A1* 1/2014 Hayashi ................. H10N 10/17 136/205
2016/0027986 A1* 1/2016 Kim ....................... H10N 10/17 136/200
2016/0104450 A1* 4/2016 Lee ...................... G09G 3/3688 345/211
2016/0124489 A1* 5/2016 Kang .................... G06F 1/3265 713/323
2017/0284708 A1* 10/2017 Wang ..................... H10N 10/17
2018/0158429 A1* 6/2018 Na ....................... G09G 3/3688
2020/0204743 A1* 6/2020 Cheng ................. G06F 13/4086

* cited by examiner

*Primary Examiner* — Adam J Snyder
(74) *Attorney, Agent, or Firm* — ROTHWELL, FIGG, ERNST & MANBECK, P.C.

(57) ABSTRACT

Disclosed herein is a method of controlling a display driving apparatus configured to operate a display device that displays an image. The method includes receiving a first image signal (RGB) from an external system, converting the first image signal (RGB) into a second image signal (RGB') in a format processable by a data driver, outputting the second image signal (RGB'), converting the second image signal (RGB') into a source signal based on a data control signal generated by a timing controller, converting heat energy generated by the data driver into a voltage, calculating a temperature of the data driver based on the converted voltage, and changing a resistance for impedance matching between the timing controller and the data driver based on the calculated temperature.

20 Claims, 13 Drawing Sheets

DISPLAY DRIVING APPARATUS FOR OPERATING DISPLAY DEVICE THAT DISPLAYS IMAGE AND CONTROL METHOD THEREFOR

This application claims the benefit of Korean Patent Application Nos. 10-2022-0173357, filed on Dec. 13, 2022, 10-2022-0173358, filed on Dec. 13, 2022, and 10-2023-0164135, filed on Nov. 23, 2023, all of which are hereby incorporated by reference in their entirety as if fully set forth herein.

BACKGROUND

Technical Field

Embodiments of the present disclosure relate to a display device. For example, the display device may include a liquid crystal display (LCD), an organic light-emitting diode (OLED), a mini light-emitting diode (mini LED), a micro light-emitting diode (micro LED), and a quantum dot light-emitting diode (QLED). However, the present disclosure is not limited to any specific device. The display device mentioned in this document may be, for example, a finished product (e.g., television (TV), digital signage, mobile phone, automobile navigation, etc.) or a component for controlling a display module (e.g., driver integrated circuit (IC), timing controller (T-CON), etc.).

Discussion of the Related Art

Recently, energy harvesting technologies have been discussed. The energy harvesting technology refers to a technology of collecting wasted energy from the surroundings and using the collected wasted energy as power.

For example, heat, light, pressure, wind, radio frequency (RF), and so on generated by various chips (system-on-chip (SoC), etc.) may be converted into and stored as energy by a conversion circuit and then used as power.

However, according to the energy harvesting technology in the prior art, only power is used and there is no information about temperature, which may lead to some issues.

The resistance value of a resistor of a chip in a display device varies by up to 40% depending on temperature changes. For example, when the impedance between a timing controller and a source driver integrated circuit (SD-IC) is not matched, the impact of signal reflections increases, which leads to the problem of difficulty in high-speed operation.

SUMMARY

Accordingly, the present disclosure is directed to a display driving apparatus for operating a display device that displays an image and control method therefor that substantially obviate one or more problems due to limitations and disadvantages of the related art.

One of the embodiments of the present disclosure aims to provide a technology for actively adjusting the resistance of an impedance matching unit by detecting the operating temperature of a display driving apparatus (e.g., source driver integrated circuit (SD-IC), etc.) in various ways when the energy harvesting technology is applied to a display device.

To achieve these objects and other advantages and in accordance with the purpose of the disclosure, as embodied and broadly described herein, there is provided a method of controlling a display driving apparatus configured to operate a display device that displays an image. The method includes: receiving a first image signal (RGB) from an external system; converting the first image signal (RGB) into a second image signal (RGB') in a format processable by a data driver; outputting the second image signal (RGB'); converting the second image signal (RGB') into a source signal based on a data control signal generated by a timing controller; converting heat energy generated by the data driver into a voltage; calculating a temperature of the data driver based on the converted voltage; and changing a resistance for impedance matching between the timing controller and the data driver based on the calculated temperature.

For example, when the display device corresponds to a first type in which the resistance for the impedance matching increases as the temperature increases, the changing further includes turning off one or more switches connected to resistors for the impedance matching in the data driver.

For example, when the display device corresponds to a second type in which the resistance for the impedance matching decreases as the temperature increases, the changing further includes turning on the one or more switches connected to the resistors for the impedance matching in the data driver.

When the calculated temperature is lower than or equal to 50 degrees Celsius, the changing may be disabled.

The data driver may consist of n source driver integrated circuits (ICs), where n is an integer greater than or equal to 1.

In another aspect of the present disclosure, provided herein is a display driving apparatus configured to operate a display device that displays an image. The display driving apparatus includes: a timing controller configured to receive a first image signal (RGB) from an external system, convert the first image signal (RGB) into a second image signal (RGB'), and output the second image signal (RGB'); a data driver configured to convert the second image signal (RGB') into a source signal based on to a data control signal generated by the timing controller; and an energy harvesting device configured to convert heat energy generated by the data driver into a voltage, In particular, the data driver is configured to: for example, calculate a temperature of the data driver based on the converted voltage; and change a resistance for impedance matching between the timing controller and the data driver based on the calculated temperature.

Implementing a computer-readable medium (e.g., application, memory, software, etc.) having recorded thereon a program for executing any of the above-described method and various embodiments described herein by a third party is also within the scope of the present disclosure.

According to one of the embodiments of the present disclosure, the accuracy of impedance matching of a data driver (e.g., source driver integrated circuit (SD-IC), etc.) used in various display devices (e.g., televisions (TVs), mobile phones, information technology (IT) devices, etc.) may be improved, thereby potentially enabling high-speed operation.

It is apparent that in addition to the effects described above, effects capable of being inferred by those skilled in the art from the specification should also be considered.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the embodiments disclosed herein will be described in detail with reference to the accompanying drawings. Wherever possible, the same reference numbers will be used throughout the drawings to refer to the same or like parts, and redundant description thereof will be omitted. The suffixes "module" and "part" used for the components mentioned herein are assigned for convenience of description and used interchangeably, and the suffixes do not inherently have distinct meanings or roles.

If providing detailed description of relevant prior art in explaining the embodiments disclosed in this specification is deemed to potentially obscure the gist of the disclosed embodiments, the detailed description will be omitted. In addition, the attached drawings are provided solely for the purpose of facilitating the understanding of the embodiments disclosed in this specification, and the technical idea disclosed in this specification are not limited by the attached drawings. The embodiments should be understood to encompass all variations, equivalents, and substitutions within the spirit and scope of the present disclosure.

Terms that include ordinal numbers such as first and second may be used to describe various components, but the components are not limited by these terms. The terms are used only to distinguish one component from another. When one component is said to be "connected to" or "attached to" another component, it should be understood that the component may be directly connected or attached to the other component, but there may also be other components in between.

On the other hand, when one component is said to be "directly connected to" or "directly attached to" another component, it should be understood that there are no other components in between.

As used herein, singular forms include plural referents unless the context clearly dictates otherwise.

In this specification, terms such as "includes" or "has" are intended to specify the presence of the features, numbers, steps, operations, components, parts, or combinations thereof disclosed in the specification, rather than excluding the presence or possibility of one or more other features, numbers, steps, operations, components, parts, or combinations thereof.

Figure 1:
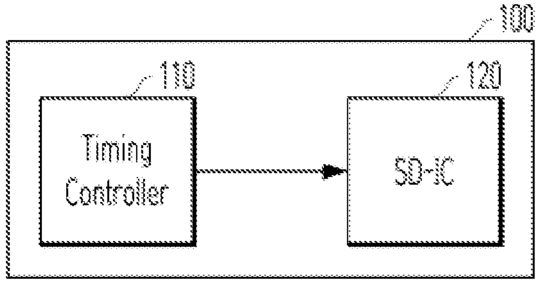
FIG. 1 schematically illustrates a display device according to an embodiment of the present disclosure.

FIG. 1 schematically illustrates a display device according to an embodiment of the present disclosure.

A timing controller 110 receives a first image signal (RGB) from an external system and converts the first image signal (RGB) into a second image signal (RGB') to output the second image signal (RGB') to a source driver integrated circuit (SD-IC) 120. The SD-IC 120 is an example of a data driver.

The SD-IC 120 converts the second image signal (RGB') into a source signal based on a data control signal generated by the timing controller 110.

An energy harvesting device converts heat energy generated by the SD-IC 120 into a voltage. The SD-IC 120 is an example of a data driver as described above.

Examples of energy harvesting devices will be described below with reference to FIGS. 2, 3*a* and 3*b*.

Figure 2:
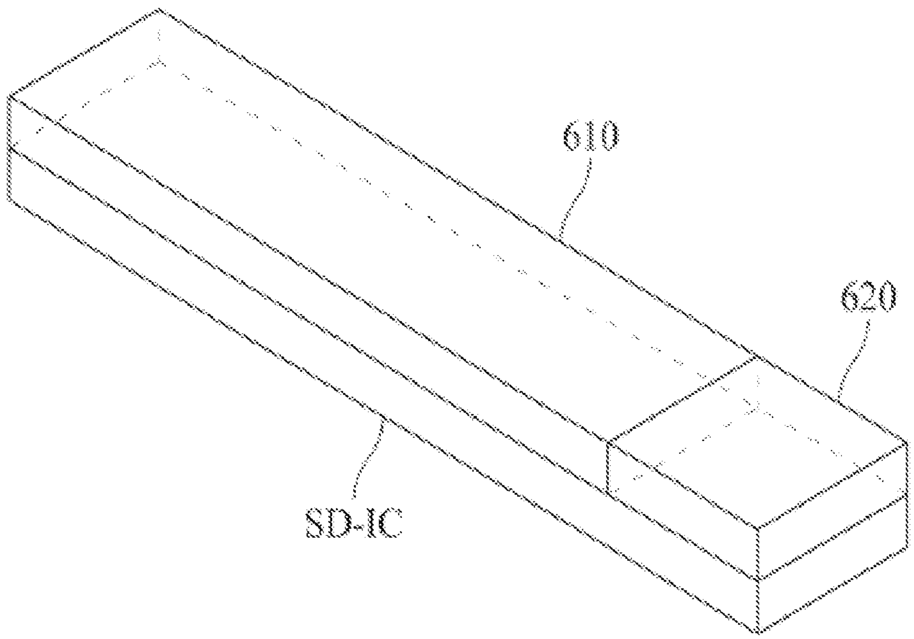
FIG. 2 illustrates the configuration of an energy harvesting device according to an embodiment of the present disclosure.

FIG. 2 illustrates the configuration of an energy harvesting device according to an embodiment of the present disclosure. FIG. 3*a* illustrates a thermal energy converter consisting of a plurality of thermoelectric modules according to an embodiment of the present disclosure. FIG. 3*b* illustrates the structure of a thermoelectric module according to an embodiment of the present disclosure.

The energy harvesting device absorbs thermal energy generated in the surroundings thereof and converts the absorbed thermal energy into electrical energy for output.

For example, as shown in FIG. 2, the energy harvesting device includes a thermal energy converter 610 and an energy storage unit 620.

The thermal energy converter 610 converts thermal energy into electrical energy for output. Specifically, the thermal energy converter 610 absorbs thermal energy generated by an SD-IC, converts the absorbed thermal energy to output an energy harvesting current. In this case, the thermal energy converter 610 may be placed in contact with the SD-IC to effectively absorb the thermal energy generated by the SD-IC.

According to an embodiment of the present disclosure, since the thermal energy converter 610 is directly connected to the energy storage unit 620, which will be described later, the energy harvesting current (Ceh) is output directly to the energy storage unit 620 without passing through a separate rectifier circuit.

Figure 3A:
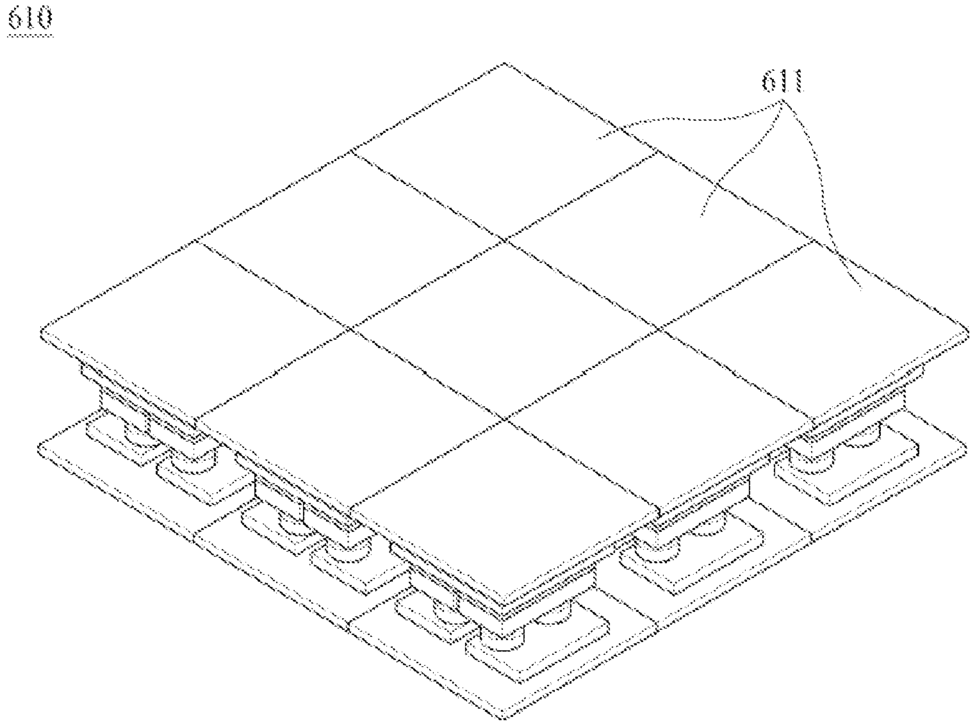
FIG. 3*a* illustrates a thermal energy converter consisting of a plurality of thermoelectric modules according to an embodiment of the present disclosure.

As shown in FIG. 3*a*, the thermal energy converter 610 includes a plurality of thermoelectric modules 611 that convert the thermal energy generated by the SD-IC into electrical energy. The plurality of thermoelectric modules 611 may be arranged in a matrix form of n×m (where n and m are positive integers). Alternatively, the plurality of thermoelectric modules 611 may be disposed on the SD-IC in a film form and integrated with the SD-IC.

Figure 3B:
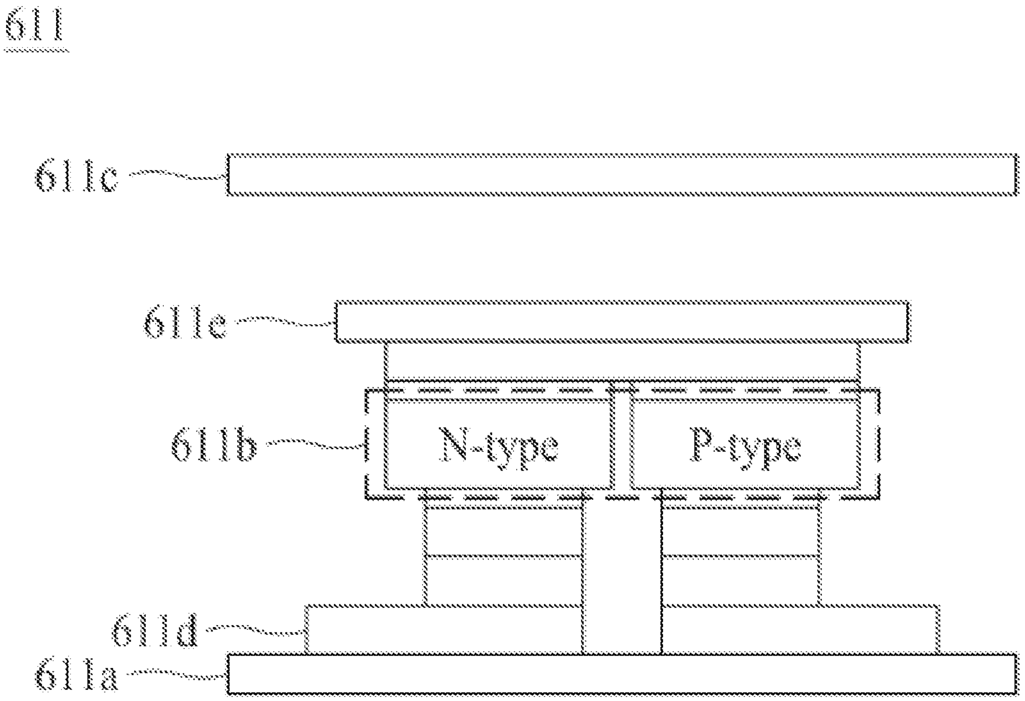
FIG. 3*b* illustrates the structure of a thermoelectric module according to an embodiment of the present disclosure.

Referring to FIG. 3*b*, the thermoelectric module 611 includes a first substrate 611*a* that absorbs heat, a unit cell 611*b* including a p-type semiconductor and an n-type semiconductor, a second substrate 611*c* arranged in opposition to the first substrate 611*a*, a first electrode 611*d* disposed between the first substrate 611*a* and the unit cell 611*b*, and a second electrode 611*e* disposed between the second substrate 611*c* and the unit cell 611*b*. The p-type semiconductor is a p-type thermoelectric semiconductor capable of moving holes to transfer thermal energy, and the n-type semiconductor is an n-type thermoelectric semiconductor capable of moving electrons to transfer electrical energy. Additionally, the thermoelectric module 611 may further include a dielectric layer positioned between the first electrode 611*d* and the unit cell 611*b* and between the unit cell 611*b* and the second electrode 611*e*. However, the thermoelectric module 611 is not limited thereto, and the thermoelectric module 611 may include materials or structures for converting thermal energy into electrical energy.

According to an embodiment of the present disclosure, the energy storage unit 620 is disposed in the form of a film on the SD-IC. As a result, the energy storage unit 620 is integrated with the SD-IC, allowing for a reduction in the area occupied by the energy storage unit 620.

In addition, an encoder (thermometer encoder) counts the number of 1s and outputs the number of 1s as a digital value (COMP). A more specific embodiment related thereto will be described in detail in FIG. 5 below.

A temperature ranking discriminator 430 calculates the operating temperature of the SD-IC based on the digital value (COMP).

A temperature resistance converter 440 determines whether to turn on or off switches based on the resistance type of the display device.

An impedance matching unit 450 changes a resistance value based on the number of switches turned on/off. Therefore, it is possible to address the issue of impedance mismatching with a timing controller caused by changes in the temperature of the SD-IC. An embodiment related thereto will be described in FIG. 6 below.

Figure 4:
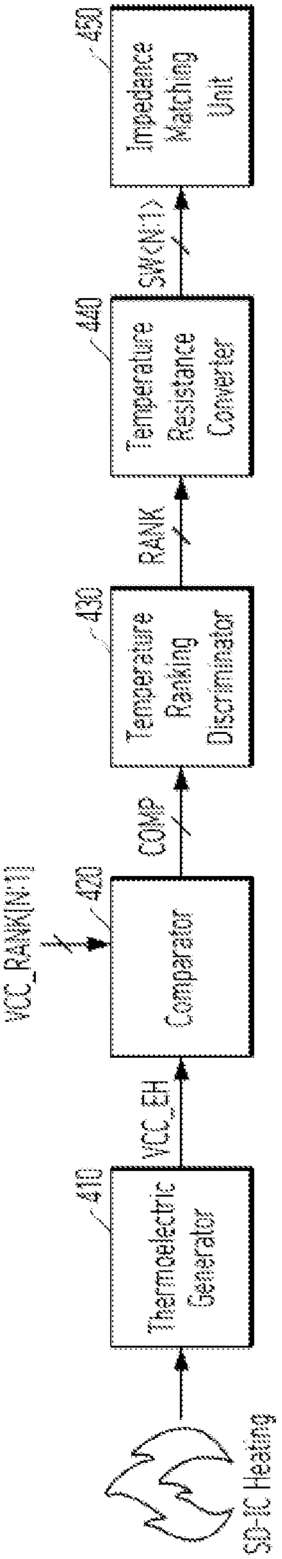
FIG. 4 illustrates a display driving apparatus according to an embodiment of the present disclosure.

Example values for the terms mentioned in FIG. 4 are provided in Table 1 below.

TABLE 1

| TEMP (Temperature) | VCC_EH (Voltage) | VCC_RANK | RANK | CASE1 (Resistance) | CASE2 (Resistance) |
|---|---|---|---|---|---|
| 150 | 1.8 | 1.8 | N | 70 | 30 |
| 145 | 1.7 | 1.7 | N − 1 | 67 | 33 |
| . . . | . . . | . . . | . . . | . . . | . . . |
| 65 | 0.6 | 0.6 | 0010 | 56 | 44 |
| 60 | 0.5 | 0.5 | 001 | 53 | 47 |
| Below 50 degrees | 0.4 | Not in use | 000 | 50 | 50 |

However, while the energy harvesting device has the advantage of converting the thermal energy generated by the SD-IC into electrical energy, the energy harvesting device may have issues of impedance matching with a timing controller due to the heat generated by the SD-IC. The present disclosure aims to address these issues.

Hereinafter, an embodiment of calculating the operating temperature of an SD-IC and changing the resistance of an impedance matching unit in the SD-IC based on the output voltage generated from a thermoelectric generator will be described in detail with reference to FIGS. 4 to 8.

Another embodiment of changing the resistance of an impedance matching unit in an SD-IC by additionally using an oscillator will be described in detail with reference to FIGS. 9 to 12 below.

FIG. 4 illustrates a display driving apparatus according to an embodiment of the present disclosure. However, it should be noted that the present disclosure is not limited thereto, and the scope of the present disclosure is determined according to what is set forth in the claims.

A thermoelectric generator 410 generates a voltage (VCC_EH), which corresponds to, for example, the heating temperature of an SD-IC.

A comparator 420 compares the voltage (VCC_EH) output by the thermoelectric generator 410 with a reference voltage, VCC_RANK [N:1].

Here, the reference voltage, VCC_RANK [N:1] represents a value for dividing voltages from the minimum voltage output by the thermoelectric generator 410 to the maximum voltage output by the thermoelectric generator 410 into N equal parts. Details thereof will be explained in Table 1 below.

If the voltage (VCC_EH) is higher than the reference voltage (VCC_RANK), the value of Q is 0, and if the voltage (VCC_EH) is lower than the reference voltage (VCC_RANK), the value of Q is 1.

Figure 5:
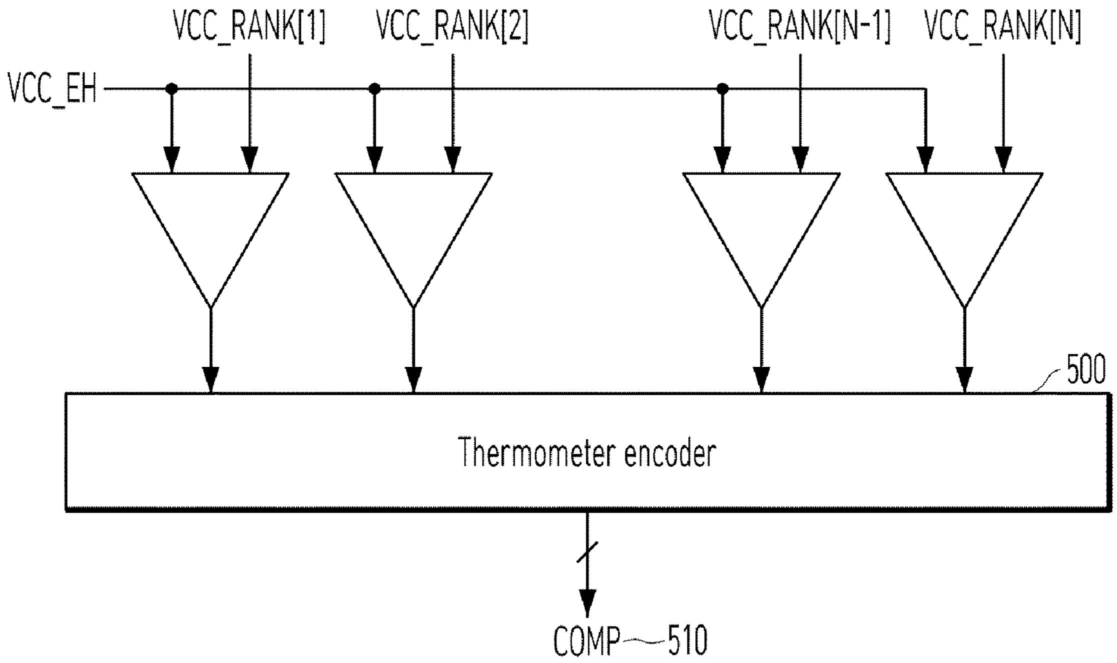
FIG. 5 illustrates a comparator shown in FIG. 4.

FIG. 5 illustrates the comparator shown in FIG. 4. Hereinafter, the operations of the comparator will be described with reference to Table 1 above.

For example, it is assumed that VCC_EH (voltage) is 1. Reference voltages are defined as follows. VCC_RANK[1] corresponds to 0.5, VCC_RANK[2] corresponds to 0.6, VCC_RANK[3] corresponds to 0.7, VCC_RANK[4] corresponds to 0.8, VCC_RANK[5] corresponds to 0.9, VCC_RANK[6] corresponds to 1.0, VCC_RANK[7] corresponds to 1.1, VCC_RANK[8] corresponds to 1.2, VCC_RANK[9] corresponds to 1.3, VCC_RANK[10] corresponds to 1.4, VCC_RANK[11] corresponds to 1.5, VCC_RANK[12] corresponds to 1.6, VCC_RANK[13] corresponds to 1.7, and VCC_RANK[14] corresponds to 1.8.

In this case, if the voltage (VCC_EH) is greater than the reference voltage (VCC_RANK), 0 is output, and if the voltage (VCC_EH) is smaller than the reference voltage (VCC_RANK), 1 is output.

An encoder 500 counts the number of 1s and outputs the number of 1s as a digital value (COMP). In this case, the digital value may be 00000011111111, for example.

Based on Table 1 above, a rank (RANK) corresponding to the digital value (COMP) is detected, and a temperature corresponding to the rank (RANK) is calculated inversely.

After calculating the operating temperature of the SD-IC, it may be determined whether the calculated operating temperature corresponds to Case 1 or Case 2 shown in Table 1. Then, depending on this determination, whether to turn on/off switches connected to resistors of an impedance matching unit and the number of switches may be determined.

A more specific embodiment will be described with reference to FIG. 6 below.

Figure 6:
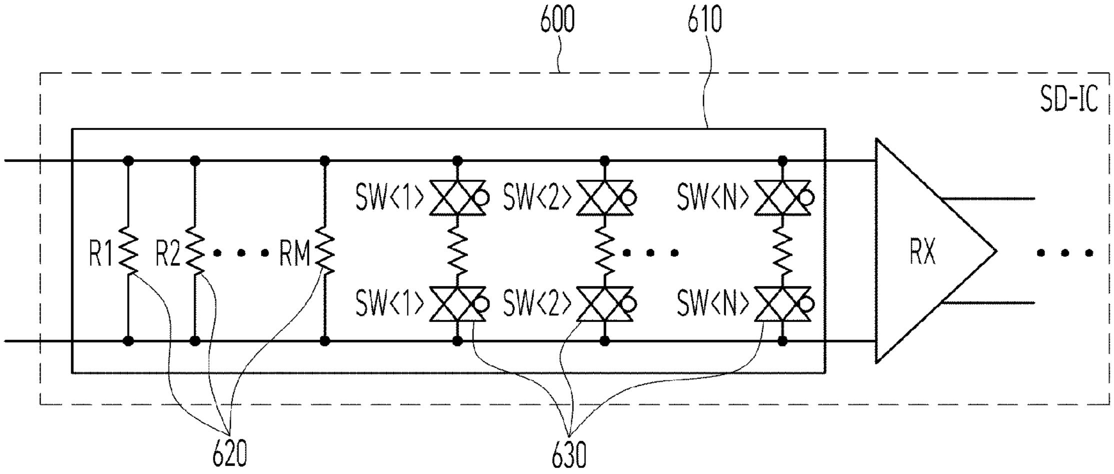
FIG. 6 illustrates an impedance matching unit shown in FIG. 4.

FIG. 6 illustrates the impedance matching unit shown in FIG. 4.

For example, it is assumed that that the calculated operating temperature of an SD-IC is 65 as shown in Table 1.

When a display device including an SD-IC 600 corresponds to Case 1 in Table 1, that is, when the resistance increases as the temperature increases, switches 630 are turned off, except for fixed resistors 620 with no switches.

When the temperature of the SD-IC is below 50 degrees, there is no need to change the resistance of the impedance matching unit, which is indicated as a rank (RANK) of 0 in Table 1.

On the other hand, when the operating temperature of the SD-IC is 65 degrees, and when the display device corresponds to Case 1, this corresponds to a rank (RANK) of 2. Thus, two switches 630 are turned off. It is not necessary to strictly match the number of ranks with the number of switches turned on/off.

Figure 7:
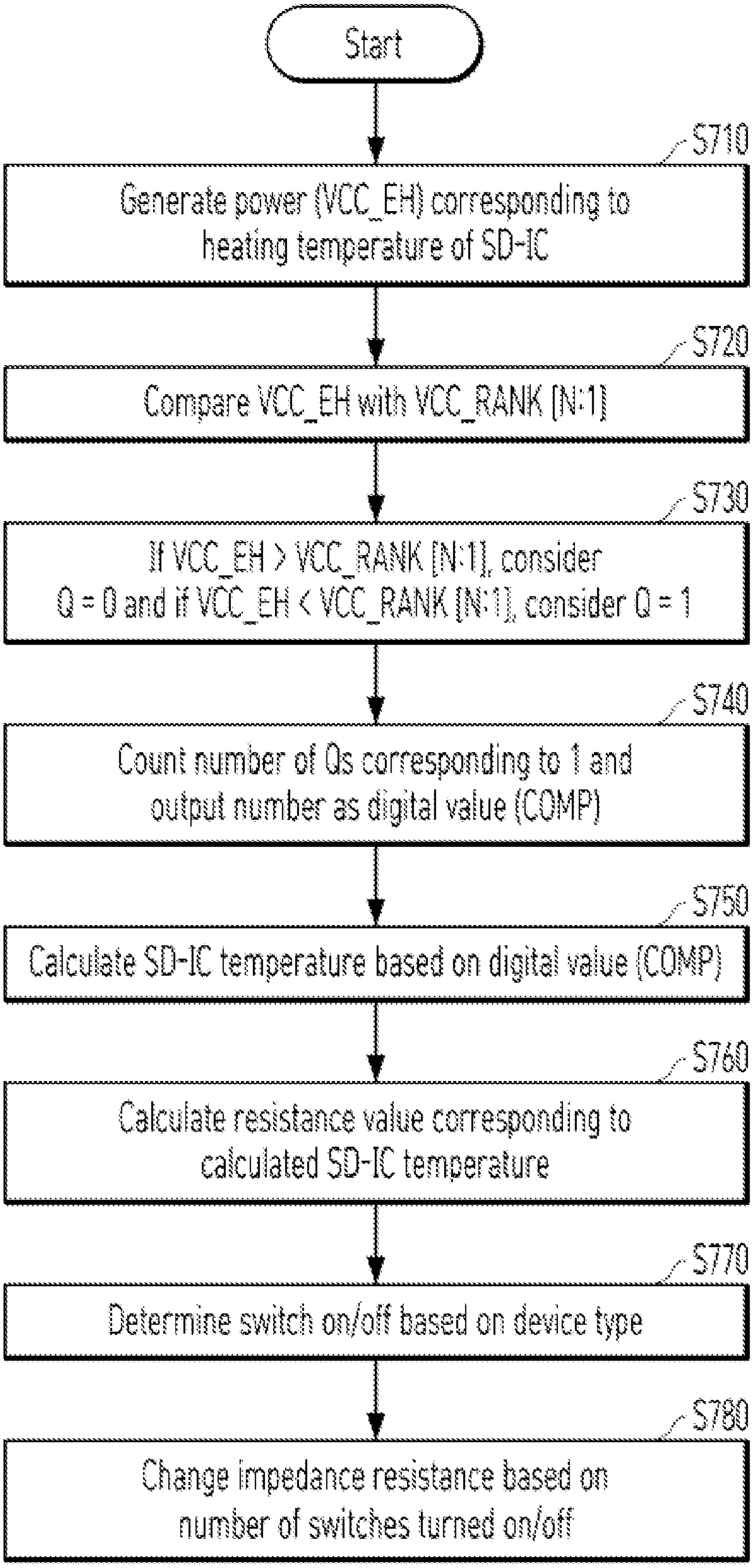
FIG. 7 is a flowchart illustrating an operational process of the display driving apparatus shown in FIG. 4.

FIG. 7 is a flowchart illustrating an operational process of the display driving apparatus shown in FIG. 4.

Although not shown in FIG. 7, the display driving apparatus for operating a display device that displays images receives a first image signal (RGB) from an external system and converts the first image signal into a second image signal (RGB') in a format processable by a data driver for output. In addition, the display driving apparatus converts the second image signal (RGB') into a source signal based on a data control signal generated by a timing controller.

The display driving apparatus generates a voltage (VCC_EH) corresponding to the heating temperature of the data driver (for example, n SD-ICs) (S710).

The display driving apparatus calculates the temperature of the data driver based on the voltage. Then, the display driving apparatus changes a resistance for impedance matching between the timing controller and the data driver based on the calculated temperature.

More specifically, as shown in FIG. 7, the display driving apparatus according to an embodiment of the present disclosure compares a voltage (VCC_EH) corresponding to the heating temperature of the SD-IC with a reference voltage, VCC_RANK [N:1] (S720).

If the voltage (VCC_EH) is greater than the reference voltage (VCC_RANK), the display driving apparatus considers the value of Q as 0. If the voltage (VCC_EH) is less than the reference voltage (VCC_RANK), the display driving apparatus considers the value of Q as 1 (S730).

The display driving apparatus counts the number of 1s and outputs the number of 1s as a digital value (COMP) (S740). The display driving apparatus calculates the operating temperature of the SD-IC based on Table 1 (S750) and calculates a resistance value related to the calculated temperature (S760).

The display driving apparatus determines whether to turn on or off switches based on the device type of the display device (S770). The display driving apparatus changes an impedance resistance value within the SD-IC based on the number of switches turned on/off (S780). Therefore, it is possible to address the issue of impedance mismatching with the timing controller caused by changes in the temperature of the SD-IC.

Figure 8:
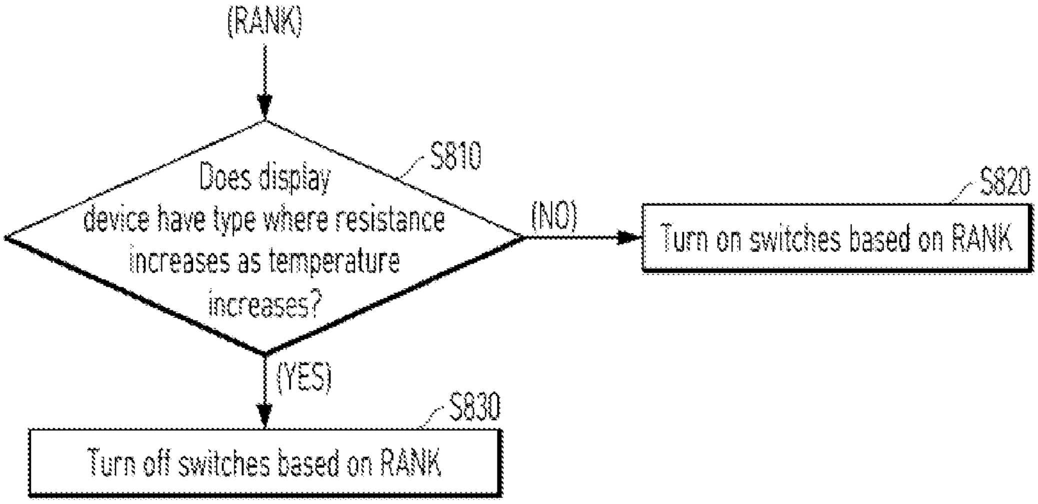
FIG. 8 is a flowchart illustrating steps S770 and S780 shown in FIG. 7 in detail.

FIG. 8 is a flowchart illustrating steps S770 and S780 shown in FIG. 7 in detail.

There are two types of display devices: one in which the resistance increases as the temperature increases and the other in which the resistance decreases as the temperature increases.

Therefore, as shown in FIG. 8, a display driving apparatus according to an embodiment of the present disclosure determines whether a display device is of the type where the resistance increases as the temperature increases (S810).

If the display device corresponds to a first type where the resistance for impedance matching increases as the temperature increases, the display driving apparatus turns off one or more switches connected to resistors for impedance matching in a data driver (S830). The number of switches turned off among switches connected to the resistors may be adjusted uniformly based on the rank (RANK) as described above.

On the other hand, if the display device corresponds to a second type where the resistance for impedance matching decreases as the temperature increases, the display driving apparatus turns on one or more switches connected to the resistors for impedance matching in the data driver (S820). The number of switches turned on among switches connected to the resistors may be adjusted uniformly based on the rank (RANK) as described above.

However, according to the aforementioned embodiment, if the temperature of the SD-IC changes slightly frequently over a short period, switches may be toggled frequently to change the resistance for impedance matching in the SD-IC, which may lead to overload and other noise issues.

To address this issue, another embodiment will be described in detail in FIG. 9 below.

Figure 9:
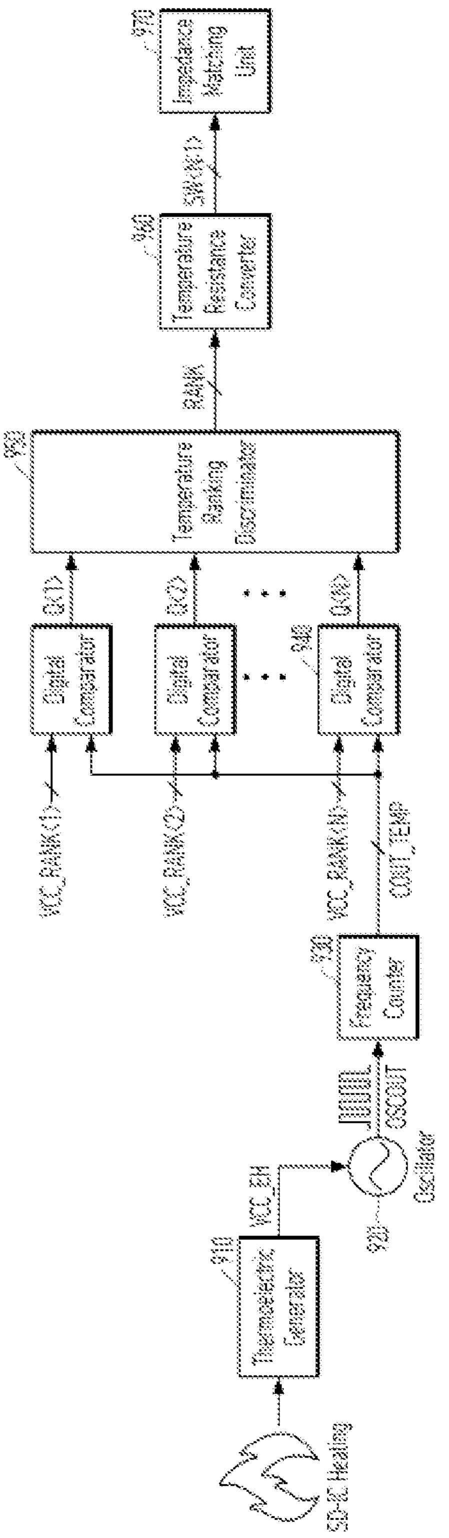
FIG. 9 illustrates a display driving apparatus according to another embodiment of the present disclosure.

FIG. 9 illustrates a display driving apparatus according to another embodiment of the present disclosure.

If an oscillator with an oscillation frequency that varies depending on the output voltage of a thermoelectric generator is used, counting is performed for a certain period even if the voltage changes temporarily. Thus, switch toggling for changing the resistance value of an impedance matching unit in an SD-IC may be minimized.

A thermoelectric generator 910 generates a voltage (VCC_EH), which corresponds to, for example, the heating temperature of an SD-IC.

An oscillator 920 outputs an oscillation frequency (OSCOUT) corresponding to the input voltage (VCC_EH).

A frequency counter 930 converts the input oscillation frequency (OSCOUT) into a digital value (COUT_TEMP) related thereto.

A digital comparator 940 compares the digital value (COUT_TEMP) with a reference voltage (VCC_RANK [N:1]).

Here, the reference voltage VCC_RANK [N:1] divides the oscillation frequency of the oscillator per voltage into N frequency bands through simulation as shown in Table 2 below.

If the digital value (COUT_TEMP) related to the oscillation frequency is greater than the reference voltage (VCC_RANK), the value of Q is 0, and if the digital value (COUT_TEMP) related to the oscillation frequency is smaller than the reference voltage (VCC_RANK), the value of Q is 1.

A temperature ranking discriminator 950 checks a point in time at which the Q value transitions from 0 to 1 and calculates the operating temperature of the SD-IC.

A temperature resistance converter 960 determines whether to turn on or off switches based on the resistance type of the display device.

An impedance matching unit 970 changes a resistance value based on the number of switches turned on/off. Therefore, it is possible to address the issue of impedance mismatching with a timing controller caused by changes in the temperature of the SD-IC.

Example values for the terms mentioned in FIG. 9 are provided in Table 2 below.

TABLE 2

| Temp. (Temperature) | VCC_EH (Voltage) | OSCOUT (GHz) | COUT_TEMP | VCC_RANK | Case1 (Resistance) | Case2 (Resistance) |
|---|---|---|---|---|---|---|
| 150 | 1.8 | 1 | N | N | 70 | 30 |
| 145 | 1.7 | 0.93 | N − 1 | N − 1 | 67 | 33 |
| . . . | . . . | . . . | . . . | . . . | . . . | . . . |
| 65 | 0.6 | 0.17 | 2 | 2 | 56 | 44 |
| 60 | 0.5 | 0.1 | 1 | 1 | 53 | 47 |
| Below 50 degrees | 0.4 | Not oscillating | Not in use | Not in use | 50 | 50 |

Figure 11:
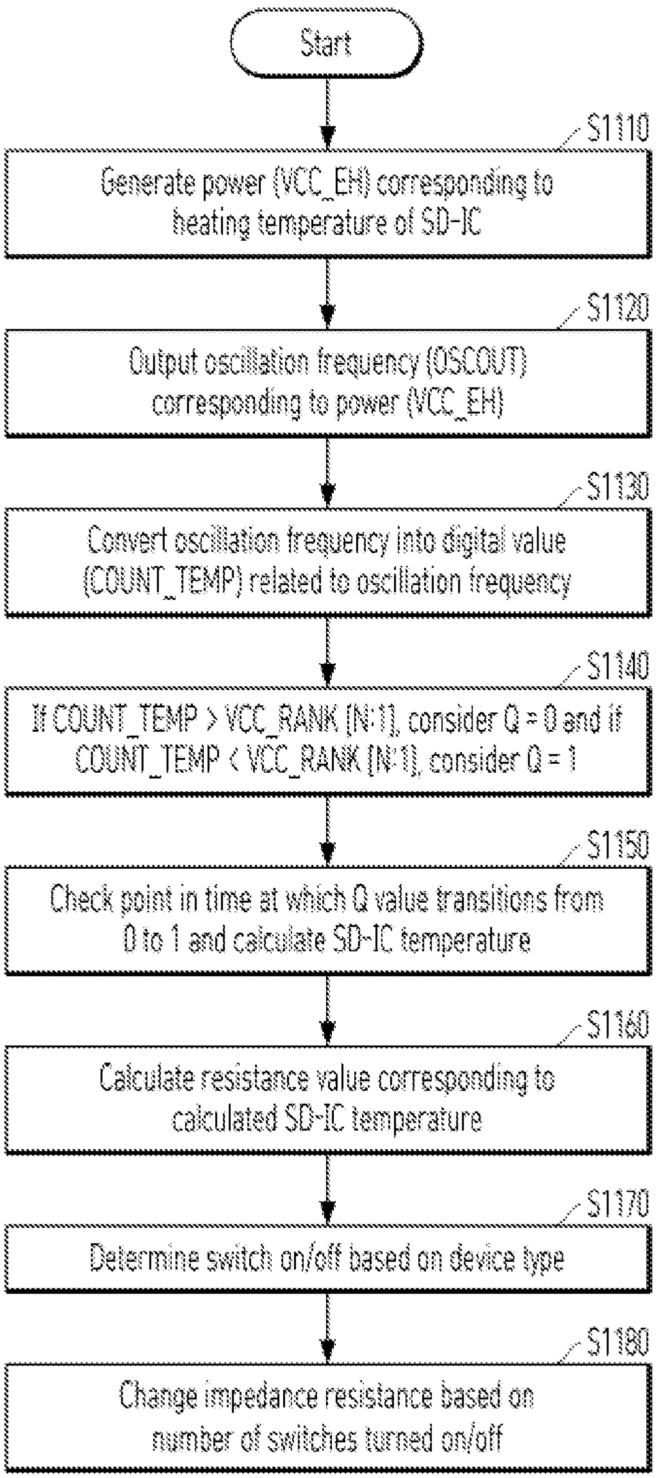
FIG. 11 is a flowchart illustrating an operation process of the display driving apparatus shown in FIG. 9.
Figure 12:
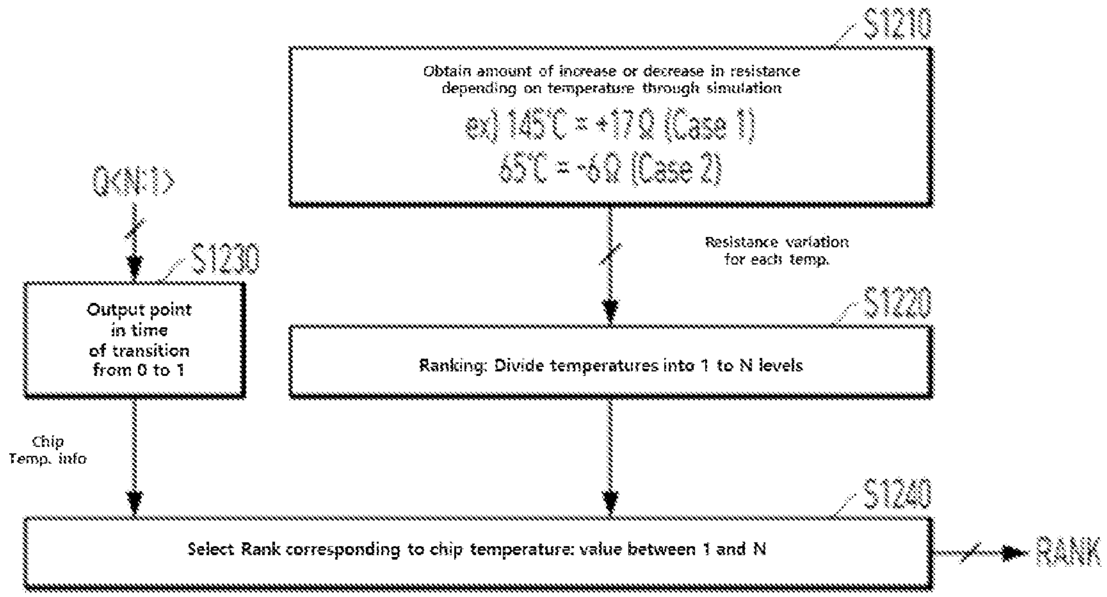
FIG. 12 is a flowchart illustrating steps S1140 and S1150 shown in FIG. 11 in detail.

FIG. 12 is a flowchart illustrating steps S1140 and S1150 shown in FIG. 11 in detail. In particular, steps S1140 and S1150 will be explained with reference to Table 2.

A display driving apparatus according to another embodiment of the present disclosure obtains the amount of increase or decrease in the resistance depending on changes in the temperature of an SD-IC through simulation (S1210).

Figure 10:
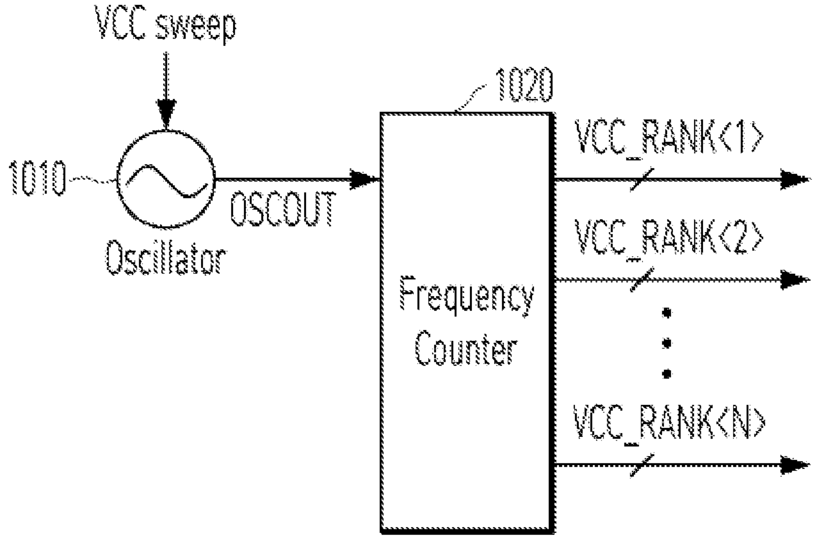
FIG. 10 is a diagram for explaining operations of an oscillator and frequency counter shown in FIG. 9 in detail.

FIG. 10 is a diagram for explaining the operations of the oscillator and frequency counter shown in FIG. 9 in detail.

An oscillator 1010 outputs an oscillation frequency (OSCOUT) corresponding to input power.

A frequency counter 1020 outputs a reference voltage VCC_RANK [N:1] corresponding to the oscillation frequency of the oscillator 1010 through simulation.

As shown in Table 2 above, reference voltages are defined as follows: VCC_RANK[1] corresponds to an oscillation frequency (OSCOUT) of 0.1 GHz, VCC_RANK[2] corresponds to an oscillation frequency (OSCOUT) of 0.17 GHz, VCC_RANK[N−1] corresponds to an oscillation frequency (OSCOUT) of 0.93 GHz, and VCC_RANK[N] corresponds to an oscillation frequency (OSCOUT) of 1 GHz.

FIG. 11 is a flowchart illustrating an operation process of the display driving apparatus shown in FIG. 9.

The display driving apparatus according to an embodiment of the present disclosure generates a voltage (VCC_EH) corresponding to the heating temperature of an SD-IC, for example (S1110).

The display driving apparatus outputs an oscillation frequency (OSCOUT) corresponding to the voltage (VCC_EH) generated in step S1110 (S1120) and converts the oscillation frequency (OSCOUT) into a digital value (COUT_TEMP) related thereto (S1130).

The display driving apparatus compares the digital value (COUT_TEMP) obtained in step S1130 with a reference voltage VCC_RANK [N:1].

If the digital value (COUT_TEMP) related to the oscillation frequency is greater than the reference voltage (VCC_RANK), the display driving apparatus considers the value of Q as 0. If the digital value (COUT_TEMP) corresponding to the oscillation frequency is less than the reference voltage (VCC_RANK), the display driving apparatus considers the value of Q as 1 (S1140).

The display driving apparatus checks a point in time at which the Q value transitions from 0 to 1, calculates the operating temperature of the SD-IC based on Table 2 above (S1150), and calculates a resistance value related to the calculated temperature (S1160).

The display driving apparatus determines whether to turn on or off switches based on the device type of a display device (S1170). The display driving apparatus changes an impedance resistance value within the SD-IC based on the number of switches turned on/off (S1180). Therefore, it is possible address the issue of impedance mismatching with a timing controller caused by changes in the temperature of the SD-IC.

For instance, when the heating temperature of the SD-IC corresponds to 145 degrees Celsius, the display driving apparatus needs to increase the resistance for impedance matching between a timing controller (T-CON) and the SD-IC to 17 ohms (corresponding to Case 1). On the other hand, when the heating temperature of the SD-IC corresponds to 65 degrees Celsius, the display driving apparatus needs to decrease the resistance for impedance matching between the T-CON and SD-IC to 6 ohms (corresponding to Case 2).

The display driving apparatus divides the temperature changes into N steps (S1220). Referring to Table 2, when the temperature range from 60 to 150 degrees in 5-degree increments, N would be equal to 18. However, it should be noted that the present disclosure is not limited to this and is merely an example. The display driving apparatus divides temperature changes into N steps (S1220). Referring to Table 2, when temperature changes are divided into 5 degree increments from 60 degrees to 150 degrees, N becomes 18. This is merely an example, and the present disclosure is not limited thereto.

The display driving apparatus according to the other embodiment of the present disclosure may estimate the point in time at which the Q value transitions from 0 to 1 based on the temperature of the SD-IC chip (S1230).

The display driving apparatus selects a natural number value between 1 and N for the rank (RANK) corresponding to the temperature of the SD-IC chip (S1240) by referring to Table 2.

The embodiments of the present disclosure may be implemented as computer-readable code on a medium on which programs are recorded. A computer-readable medium includes all types of recording devices capable of storing data readable by a computer system. Examples of computer-readable media include applications, hard disk drives (HDDs), solid state disks (SSDs), silicon disk drives (SDDs), read only memories (ROMs), random access memories (RAMs), compact disk read only memories (CD-ROMs), magnetic tapes, floppy disks, and optical data storage devices. The examples may also include implementations in the form of carrier waves (e.g., transmission over the Internet).

Hereinabove, specific embodiments of the data processing device and method according to the present disclosure have been described in detail. However, the embodiments are merely exemplary, and the present disclosure is not limited thereto. The present disclosure should be interpreted as encompassing the broadest scope in accordance with the fundamental principles disclosed in this specification. Those skilled in the art may combine or substitute the disclosed embodiments to implement unmentioned embodiments, but such implementation also falls within the scope of the present disclosure. Accordingly, it is evident that those skilled in the art may easily modify or alter the disclosed embodiments based on this specification, and such modifications or alterations also fall within the scope of the present disclosure.

What is claimed is:

1. A method of controlling a display driving apparatus configured to operate a display device that displays an image, the method comprising:

receiving a first image signal (RGB) from an external system;

converting the first image signal (RGB) into a second image signal (RGB') in a format processable by a data driver;

outputting the second image signal (RGB');

converting the second image signal (RGB') into a source signal based on a data control signal generated by a timing controller;

converting heat energy generated by the data driver into a voltage;

calculating a temperature of the data driver based on the converted voltage; and changing a resistance for impedance matching between the timing controller and the data driver based on the calculated temperature.

2. The method of claim 1, wherein the changing further comprises, based on that the display device corresponds to a first type in which the resistance for the impedance matching increases as the temperature increases, turning off one or more switches connected to resistors for the impedance matching in the data driver.

3. The method of claim 2, wherein the changing further comprises, based on that the display device corresponds to a second type in which the resistance for the impedance matching decreases as the temperature increases, turning on the one or more switches connected to the resistors for the impedance matching in the data driver.

4. The method of claim 3, wherein based on that the calculated temperature is lower than or equal to 50 degrees Celsius, the changing is disabled.

5. The method of claim 1, wherein the data driver consists of n source driver integrated circuits (ICs).

6. The method of claim 1, further comprising outputting an oscillation frequency related to the converted voltage.

7. The method of claim 6, wherein outputting the oscillation frequency is performed based on only that the data driver has a short temperature change cycle.

8. The method of claim 7, further comprising converting the oscillation frequency into a digital value related thereto.

9. The method of claim 8, wherein the temperature of the data driver is calculated based on the converted digital value.

10. The method of claim 1, wherein resistors for the impedance matching in the data driver have a same resistance value or different resistance values.

11. A display driving apparatus configured to operate a display device that displays an image, the display driving apparatus comprising:

a timing controller configured to receive a first image signal (RGB) from an external system, convert the first image signal (RGB) into a second image signal (RGB'), and output the second image signal (RGB');

a data driver configured to convert the second image signal (RGB') into a source signal based on to a data control signal generated by the timing controller; and an energy harvesting device configured to convert heat energy generated by the data driver into a voltage, wherein the data driver is configured to:

calculate a temperature of the data driver based on the converted voltage; and change a resistance for impedance matching between the timing controller and the data driver based on the calculated temperature.

12. The display driving apparatus of claim 11, wherein based on that the display device corresponds to a first type in which the resistance for the impedance matching increases as the temperature increases, the data driver is configured to turn off one or more switches connected to resistors for the impedance matching in the data driver.

13. The display driving apparatus of claim 12, wherein based on that the display device corresponds to a second type in which the resistance for the impedance matching decreases as the temperature increases, the data driver is configured to turn on the one or more switches connected to the resistors for the impedance matching in the data driver.

14. The display driving apparatus of claim 13, wherein based on that the calculated temperature is lower than or equal to 50 degrees Celsius, the data driver is configured to maintain the one or more switches connected to the resistors for the impedance matching, regardless of whether the display device corresponds to the first type or the second type.

15. The display driving apparatus of claim 11, wherein the data driver consists of n source driver integrated circuits (ICs).

16. The display driving apparatus of claim 11, further comprising an oscillator configured to output an oscillation frequency related to the converted voltage.

17. The display driving apparatus of claim 16, wherein the oscillation frequency is output based on only that the data driver has a short temperature change cycle.

18. The display driving apparatus of claim 17, further comprising a frequency counter configured to convert the oscillation frequency into a digital value related thereto.

19. The display driving apparatus of claim 18, wherein the temperature of the data driver is calculated based on the converted digital value.

20. The display driving apparatus of claim 11, wherein resistors for the impedance matching in the data driver have a same resistance value or different resistance values.

* * * * *